Patented Jan. 9, 1934

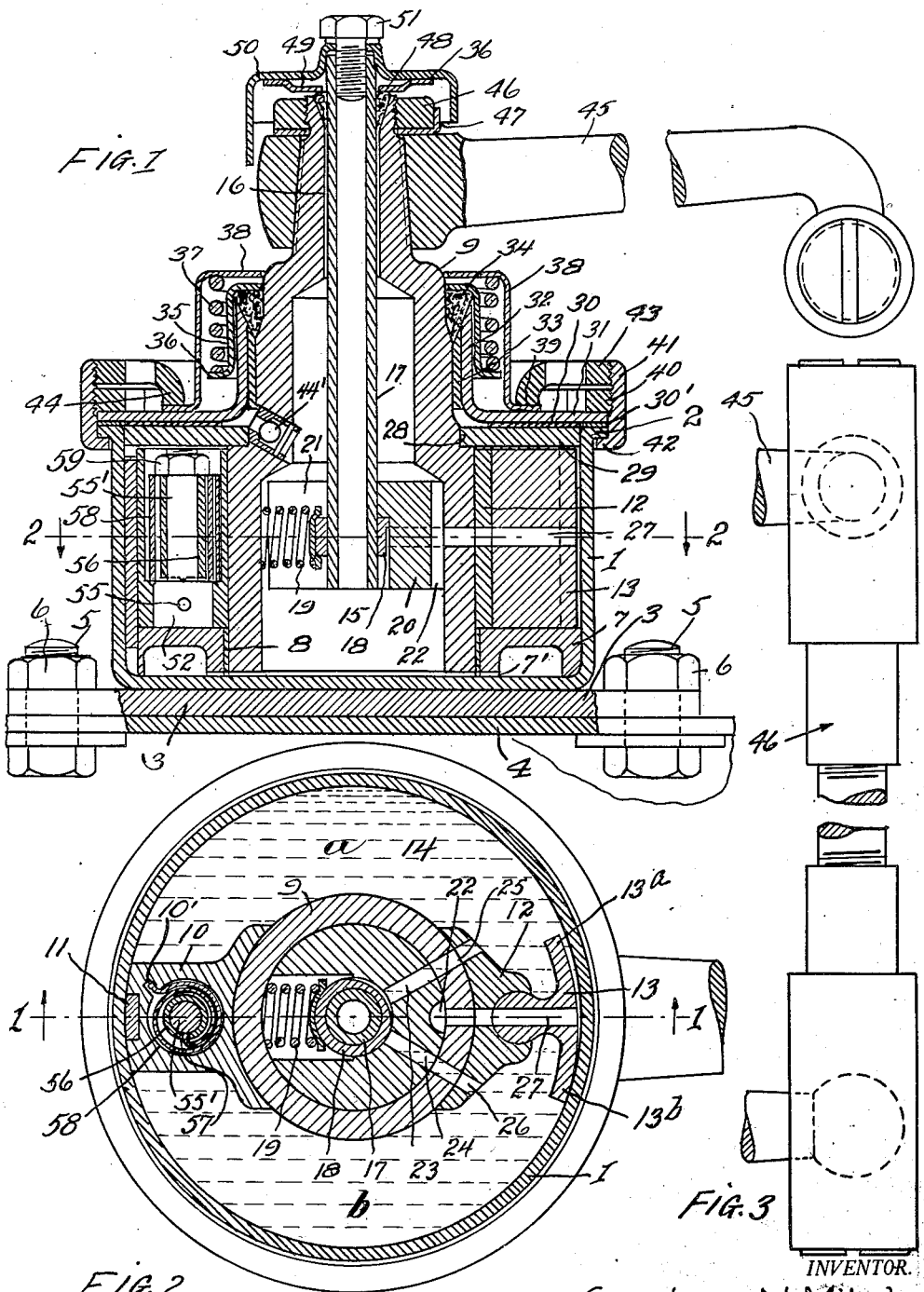

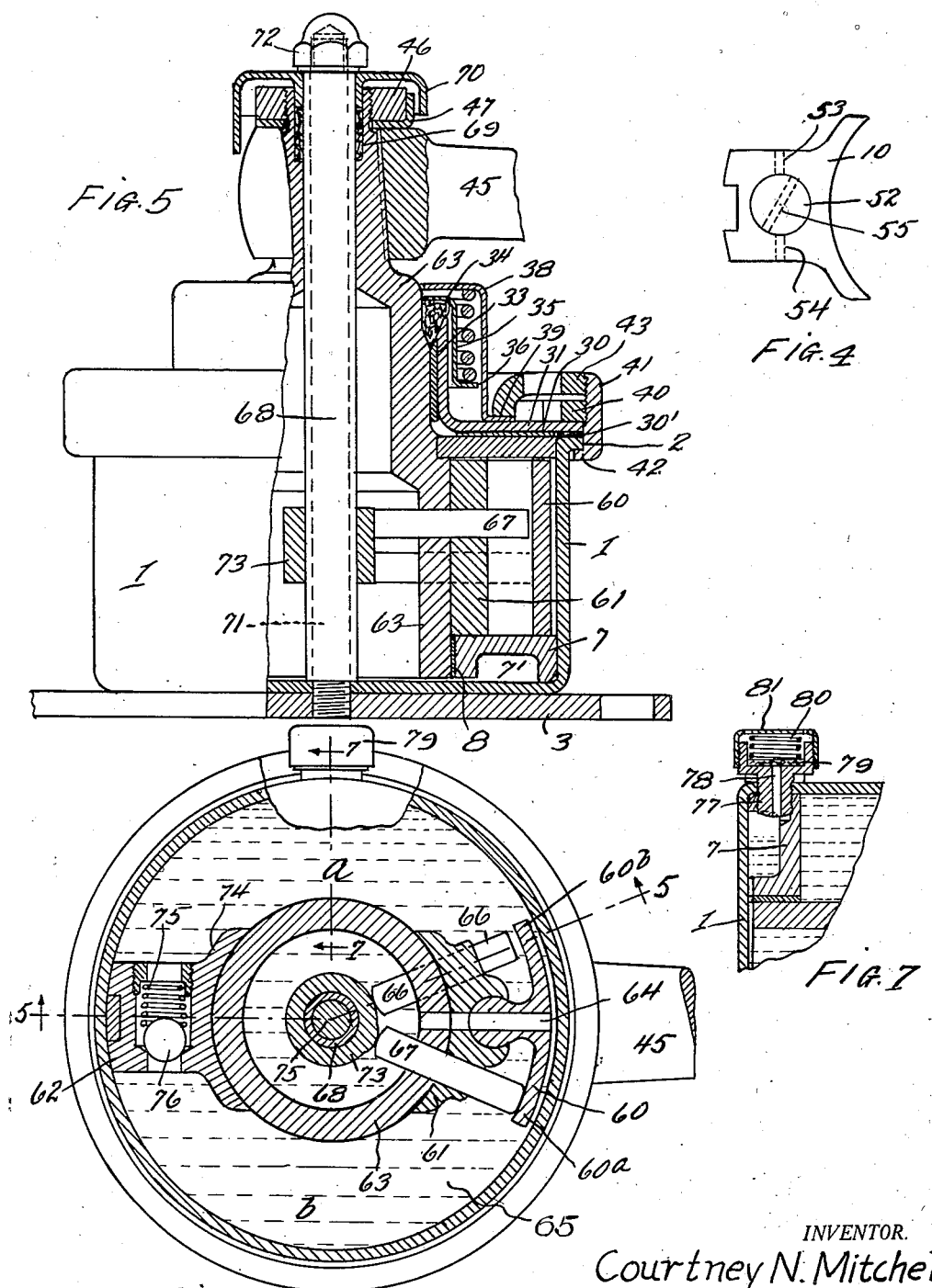

1,942,658

UNITED STATES PATENT OFFICE 1,942,658

HYDRAULIC SHOCK ABSORBER

Courtney N. Mitchell, Cleveland, Ohio

Application April 19, 1928. Serial No. 271,352

46 Claims. (Cl. 188—89)

This invention relates generally to hydraulic shock absorbers and more particularly to that class of shock absorbers adapted for use with motor vehicles.

The main object of the invention is to provide a shock absorber for checking the movement between two relatively movable members and which due to its peculiar construction and arrangement of parts is well adapted for quantity production at compartively low cost.

Another object of the invention is to provide a shock absorber of the character described which is provided with means for automatically adjusting the same to allow for wear of the piston and associated elements.

Another object of the invention is to provide a shock absorbing device for motor vehicles which will operate to retard the relative movement between the body and axle in either direction and without special assembly for right and left hand units.

A still further object of the invention is to provide a shock absorbing device which is provided with means for automatically relieving excessive pressure within a shock absorber and thus prevent breakage that may occur as the result of excessive pressures.

A still further object of the invention is to provide a shock absorber which is provided with means for automatically adjusting the same for varying conditions of temperature thereby preventing irregular action resulting from changes in the viscosity of the cushioning liquid.

Another object of the invention is to provide a shock absorbing unit of the character described that will control the recoil or rebound of the vehicle springs and also prevent abnormal deflections of the vehicle springs when a sudden load is applied thereto as may occur when the vehicle wheel suddenly encounters an obstacle in the road.

Further and more limited objects of the invention will appear as the description proceeds and by reference to the accompanying drawings in which Fig. 1 is a horizontal sectional view of the preferred embodiment of my inventon on the section line 1—1 of Fig. 2; Fig. 2 is a vertical sectional view on the line 2—2 of Fig. 1; Fig. 3 is a detail view of the connecting member for connecting the shock absorber with the vehicle axle; Fig. 4 is a detail view of the valve member for automatically adjusting the unit for variations in temperature; Fig. 5 is a view partly in horizontal section and partly in elevation of a modified form of my invention; Fig. 6 is a sectional view on the line 6—6 of Fig. 5; and Fig. 7 is a sectional view on the line 7—7 of Fig. 6.

Referring now to the drawings the reference character 1 designates a cup-shaped casing or housing having an overhanging peripheral flange 2 and which is welded to a bracket 3 for attaching the casing to a frame member 4 on which the unit is to be mounted and which is secured thereto by bolts 5 and nuts 6. Non-rotatably secured within the casing at the inner end thereof is an annular member 7 channel shaped in section and provided with a bearing 8 in which the inner end of a hollow shaft 9 is journaled. Also arranged within the casing is an abutment or block 10 which is keyed to the side wall of the casing by means of a key 11 welded thereto. The inner end of the block or abutment 10 is shaped as most clearly shown in Fig. 2 and engages with the periphery of the hollow shaft 9. The fit of the key 11 in the key-way in the block 10 is free enough to permit the block 10 to adjust itself to allow for slight irregularities in the size of the parts.

Non-rotatably secured to the shaft 9, preferably by welding, is a member 12 shaped as shown most clearly in Fig. 2. This member is located approximately 180 degrees from the abutment 10 when the parts are in the normal position.

Pivotally secured in a recess in the member 12 is a double vane substantially T-shaped piston 13 which is movable to a position to engage the wall of the casing 1. The hollow shaft 9 arranged within the casing as described provides an outer chamber 14 and an inner chamber 15 which are adapted to be filled with a viscous liquid. The shaft 9 is provided with an opening 16 through which extends a tapered tubular member 17 to the lower end of which is rigidly connected a cam-like valve member 18 against which bears a coil spring 19, the purpose of which will hereinafter appear. Secured over the lower end of the tubular member 17 is an annular block 20 provided with a rectangular recess 21 to accommodate the coil spring 19 and cam valve 18, and an axially extending bore or groove 22. The block 20 is also provided with radially extending bores 23 and 24. Extending through the block 12 and shaft 9 is a bore or passageway 25 which communicates with the bore 23. Also extending through block 12 and shaft 9 is a bore 26 which communicates with bore 24. Communicating with the axially extending bore 22 and extending through the shaft 9, block 12 and piston 13 is a bore 27 which serves to connect the interior of the hollow shaft 9 with the outer chamber 14. The tubular member 17 fits loosely in the opening in the shaft 9 and has a slight movement therein. The block 20 is non-rotatably secured to shaft 9 so as to rotate therewith. The shaft 9 is provided with an annular shoulder 28 and fitting over this shoulder and closing the end of the chamber 14 is a disk 29. In order to prevent leakage of the liquid from the chamber 14 and to provide for axial adjustment of the disk 29, I provide a gasket 30 and an annular gasket 30' over which is placed a cover 31 which just fits the top of the casing and is provided with a flange 32 surrounding the upper end of the shaft 9. Pressed within the flange 32 and bearing against the shaft 9 is a metal bushing 33 and packing 34 which serves to prevent leakage around the shaft. The bushing 33 and packing 34 are held in place by means of a cup 35 having a peripheral flange 36 which is held in place by a coil spring 37 the inner end of which bears against the flange 36 and the upper end of which bears against a cover 38 fitting over the shaft 9 and which is provided with a peripheral flange 39 which rests on the cover 31.

For the purpose of tightly sealing the casing 1, I provide a threaded ring 40 which bears against the cover 31 and has threaded engagement with an interiorly threaded ring member 41 which is provided with an inner peripheral flange 42 which engages under the flange 2 on the casing 1. Positioned over the ring member 40 is an annular member 43 which is threadedly secured to the ring member 41 and provided with a flange 44 which is disposed over and bears against peripheral flange 39 on cover 38. The small amount of liquid which may escape past disk 29 is held within the space below the metal bushing 33 and may drain past check valve 44' back into the hollow shaft 9. Non-rotatably connected to the outer end of shaft 9 is a lever arm 45 by means of which the shaft 9 is turned. The lever arm 45 is held in place by nut 46 and washer 47. For the purpose of preventing leakage around the upper end of the tubular member 17 packing 48 is provided which is held in place by a resilient washer 49 welded on cap 50 which is non-rotatably secured on tubular member 17 and held thereon by a screw 51 threadedly secured within the tubular member 17. By turning the tubular member 17, the cam valve 18 may be adjusted with respect to the ports or bores 23 and 24. The cutaway portion of the cam serves as a means for providing communication between the bores 23 and 24 and between bores 23 or 24 and the space 15 within shaft 9. The casing 1 is preferably attached to a vehicle body and the arm 45 is connected with the vehicle axle by means of a universal, adjustable connecting link 46.

With the parts in the position shown in Fig. 2 upon a downward movement of the vehicle body the shaft 9, due to its rigid connection with the vehicle axle, will be moved counterclockwise thereby causing an increase in pressure in chamber $a$ and a decrease in pressure in chamber $b$. The piston will turn abouts its pivot in the block 12 in a clockwise direction until its end 13ª contacts with the inner wall of the casing. The liquid in chamber $a$ being under pressure will escape partly around the ends of the piston. By adjusting the position of the ring 43 this clearance can be varied. The ring 43 bears against the flange 39 and flexes the wall of cover 31 and disk 29 inwardly. The liquid in chamber $a$ also will flow through bores 25 and 23 past the cam valve 18 and thence into the space 15 within the shaft 9 which communicates with the opposite side of the piston through passageway 22 and bore 27. The position of the cam valve 18 with respect to the bore 23 determines the rate of flow from the chamber $a$ to the opposite side of the piston. It will thus be seen that the position of the cam valve 18 together with the adjustment of disk 29 as above described determines the checking action between the vehicle body and axle. The passageway 27 and bore 22 constitute a vent through the piston which tends to produce a pumping action so as to prevent abnormally high pressure in the interior of the hollow valve. The auxiliary reservoir 7' beneath the annular member 7 communicates with the interior of the hollow shaft around the end thereof and acts as an additional means for preventing abnormal pressure. The coil spring 19 also permits a slight movement of tube 17 and the cam valve 18 when abnormally high pressure is reached so as to increase the rate of flow through bores 25 and 23. When the movement of the vehicle body toward the axle has been completely stopped the rebound action of the vehicle springs tends to move the body away from the axle thereby tending to rotate the shaft 9 in the opposite direction or clockwise, the piston assuming the position shown in Fig. 2. Upon movement of the shaft in this direction the action of the parts is the same except that the direction of movement is opposite.

Since the temperature of the liquid materially affects its viscosity and the resulting resistance to flow, I have provided automatic means for relieving excessive pressure under varying temperature conditions. This means embodies a thermostatic valve 52 as shown in detail in Fig. 4. The valve 52 is arranged within a recess in the block or abutment 10 which recess communicates with the chambers $a$ and $b$ by means of bores 53 and 54 respectively, the valve proper having a bore 55 therein adapted to be brought into alignment with the aforementioned bores 53 and 54. The valve 52 has a stem 55' thereon and surrounding the stem is a cylindrical sleeve 56 having a slit 57 in one side (see Fig. 2). Surrounding the sleeve 56 is a thermostatic element 58 which is in the form of a spiral having its inner end hooked in the slit 57 and its opposite end engaged in a slot 10' in the wall of the recess in block 10, as shown most clearly in Figs. 1 and 2. The initial position of the valve 52 may be selectively located by varying the position of the slit 57 of the sleeve 56 about the valve stem 55', the nut 59 being thereafter drawn up to rigidly clamp the sleeve between said nut and the head 52 of the valve. The spiral element is made of layers of two metals welded together and which have a wide difference in their coefficients of expansion, as for example brass and invar. As the temperature drops the spiral thermostatic element acts to move the valve to a position to relieve the excessive pressure so that the checking action is always substantially the same regardless of temperature conditions.

For some installations it is frequently required that the amount of resistance to movement in one direction shall vary with different positions of the piston so as to permit a free and unimpeded movement of the vehicle body for the greater part of its downward movement and to check the movement of the body near the end of its stroke. It is necessary to provide for this action in one direction without in any way decreasing the checking action over the entire return movement or rebound of the spring in the other direction. In Figs. 5 and 6 I have disclosed a modification of my invention for accomplishing this result. The essential elements of this construction are substantially identical with the construction shown in Figs. 1, 2 and 3. The main difference of this construction resides chiefly in the method of adjustment. In this unit the double vane piston 60 in its normal position does not normally contact with the inner wall of the casing. The piston 60 is pivotally secured to a block 61 which is preferably welded on the hollow shaft 63. Extending through the shaft 63, block 61 and piston 60 is a bore or passageway 64 which connects the outer compartment 65 with the interior of the hollow shaft. Extending through the shaft 63 and block 61 are a pair of radially disposed stop pins 66 and 67 the purpose of which will hereinafter appear. Rotatably mounted in the shaft 63 is a tubular member 68 the lower end of which bears against the bottom of the casing 1. For the purpose of preventing leakage around the tubular member 68 packing 69 is provided which is held in place by a cap 70 non-rotatably secured over the upper end of the tubular member. Extending through the tubular member 68 is a threaded stud or pin 71 which threadedly engages in an opening in the bottom of the casing 1. A nut 72 threaded over the end of stud 71 holds the tubular member in place. Non-rotatably secured to the tubular member 68 and arranged within the hollow shaft 63 is a cam 73 which is adapted to engage the inner ends of the stop pins 66 and 67. By loosening the nut 72 and turning the cap 70, the position of the cam with respect to the pins 66 and 67 may be adjusted. The pins 66 and 67 are frictionally held in place and since the cam is held stationary and does not rotate with the shaft 63, the pins ride over the surface of the cam when the shaft is rotated. The block or abutment 74 has an opening 75 therein which is closed by a spring pressed check valve 76 which opens only when excessive pressure is reached.

With the parts in the position shown in Fig. 6, upon a downward movement of the vehicle body the shaft 63 will be rotated in a counter-clockwise direction and the end 60ᵃ of the piston will engage the pin 67 and thus prevent the end 60ᵇ of the piston from contacting with the inner wall of the casing until the pin 67 has ridden off of the high point of the cam. The liquid in chamber a will flow past the piston 60 into chamber b and also through bore 64 into the interior of the hollow shaft 63, the pin 67 holding the piston in the position shown in Fig. 6. As the pin 67 rides off of the high point of the cam the end 60ᵇ of the piston will begin to approach the walls of the casing. As the shaft 63 rotates further the end 60ᵇ of the piston will contact with the wall of the casing 1 thus preventing the escape of liquid except over the ends of the piston and thereby building up the desired hydraulic resistance to the further downward movement of the body. Upon the return movement of the body due to the rebound of the vehicle springs, the movement of the shaft 63 will be in the opposite direction. The end 60ᵃ of the piston 60 will immediately engage the wall of the casing and thereby offering hydraulic resistance over the entire range of return movement, the pins 66 and 67 serving no function. In fact two pins are provided so that the unit will be adapted for either the right hand or left hand side of the vehicle with a minimum adjustment. The cam 73 may be proportioned so as to check the downward movement of the body as desired.

In order to provide an auxiliary reservoir for the working fluid the ring 7 is made of channel section as herein before described and threadedly secured in an opening in the casing 1 and projecting into the auxiliary reservoir is a plug 77 having an opening 78 therein venting the chamber to the atmosphere. The opening 78 is normally closed by a spring pressed check 79 held in place by a coil spring 80 supported within a cap 81 threadedly secured on the plug 77. Any air pressure which may tend to accumulate within this space may escape past the check valve 79, the valve serving to prevent ingress of air should subnormal pressure be obtained in the auxiliary reservoir. This arrangement also serves as an additional means for preventing abnormal pressure within the casing as the chamber 7' is in communication with the interior of the shaft 63 around the inner end thereof. In other respects this form of the invention is identical with the form of the invention described in connection with Figs. 1 and 2. It is to be understood that various changes in the shape, size and arrangement of the parts are contemplated without departing from the spirit of my invention and that my invention is limited only in accordance with the scope of the appended claims. Attention is particularly directed to the fact that substantially all of the parts illustrated and described can be made of metal stampings thus greatly cheapening the construction and adapting the device for quantity production at a very low cost.

One of the main features of my invention is the double acting T-shaped piston which is pivotally secured on the shaft and which is vented to produce a pumping action so as to relieve the pressure on the interior of the hollow shaft and thus reducing the probability of leakage. Another feature of my invention is the annular space below the bushing 33 and check valve 44' in the shaft 9 for permitting the liquid therein to drain back into the hollow shaft. Another feature is the spring packed cup around the shaft 9 which practically eliminates leakage around the shaft. The cam arrangement for varying the hydraulic resistance in either direction is also considered important as well as the thermostatic relief valve for automatically regulating the device for temperature conditions.

It will now be clear that I have provided a shock absorbing device which will accomplish the objects of the invention as hereinbefore stated.

Having thus described my invention, what I claim is:—

1. In a shock absorber, a casing, an axially disposed shaft journaled in said casing, a double acting piston pivotally connected to said shaft on an axis spaced from but parallel with the axis of said shaft, a cover for said casing and means for flexing said cover inwardly to vary the clearance between the cover and piston.

2. In a shock absorber, a casing adapted to be filled with a liquid, a shaft journaled in said casing and dividing the same into a pair of compartments, a double acting piston arranged within one of said compartments and pivotally connected with said shaft and means for regulating the flow of liquid from one side of said piston to the opposite side thereof upon movement of said piston in either direction, a cover for said casing and means for flexing said cover inwardly to vary the clearance between the cover and piston.

3. In a shock absorber, a casing adapted to be filled with a liquid, a shaft journaled in said casing, a double acting piston arranged within said casing and pivotally connected with said shaft, and means for regulating the flow of liquid from one side of said piston to the other side thereof, upon movement of said piston in either direction, a cover for said casing and means for flexing said cover inwardly to vary the clearance between the cover and piston.

4. In a shock absorber, a casing adapted to be filled with liquid and having an inner compartment and an outer compartment, a shaft, a double acting piston in the outer compartment and connected with said shaft, an abutment in the outer compartment cooperating with said piston to divide the outer compartment into a pair of oppositely disposed chambers, means for conveying the liquid from one side of said piston to the opposite side thereof when the piston is rotated, a cover for said casing and means for flexing said cover to vary the effective capacity of said outer compartment.

5. In a shock absorber, a casing adapted to be filled with a liquid, a shaft mounted in said casing, a piston mounted in said casing and connected with said shaft so as to have a limited oscillatory movement with respect thereto, a radially disposed abutment connected with said casing and bearing against said shaft, means for conducting the liquid from one side of said piston to the opposite side thereof when the piston is moved in either direction including means for regulating the flow whereby to control the checking action of the shock absorber, said last mentioned means embodying a cover for said casing and means for flexing the same inwardly.

6. In a shock absorber, a casing, a shaft mounted in said casing, a piston mounted in said casing and connected with said shaft for oscillatory movement therewith, the connection between said shaft and piston being such as to force said piston against the wall of said casing when the shaft is turned in either direction, a cover for said casing and means for flexing said cover inwardly to vary the clearance between the cover and piston.

7. In a shock absorbing unit of the character described, a casing, a shaft rotatably mounted in said casing and arranged axially thereof, a piston arranged within said casing and connected with said shaft, said piston being so connected with said shaft as to be moved into engagement with the wall of said casing when the shaft is rotated in either direction, a cover for said casing and means for flexing said cover inwardly to vary the clearance between the cover and piston.

8. In a shock absorber, a casing adapted to be filled with liquid, a hollow shaft journaled in said casing and dividing the same into an inner compartment and an outer compartment, a double acting piston in said outer compartment connected with said shaft so as to have a limited movement with respect thereto, an abutment and bearing against said shaft, means for conveying liquid from one side of said piston to the opposite side thereof when said piston is moved in either direction including means for regulating the rate of flow of the liquid, said last mentioned means embodying a cover for said casing and means for flexing said cover inwardly.

9. In a shock absorber, a casing adapted to be filled with liquid, a shaft journaled in said casing, a double acting piston connected with said shaft for oscillatory movement with respect thereto, an abutment on said casing and bearing against said shaft, the connection between said piston and shaft being such as to urge said piston against the walls of said casing when said shaft is moved in either direction, means for conveying liquid from one side of said piston to the opposite side thereof when said shaft is moved in either direction including means for regulating the rate of flow of the liquid, said last mentioned means employing a cover for said casing and means for flexing the same inwardly.

10. In a shock absorber a casing, a cover for said casing, a shaft journaled in said casing, a piston pivotally mounted on said shaft and limited in its oscillatory movement in either direction by the wall of said casing, and means for flexing said cover inwardly to vary the clearance between said cover and piston.

11. In a hydraulic check, a casing having a cover, a shaft journaled in said casing and cover and forming within the casing an annular space, an element non-rotatably mounted in said casing and traversing one side of said annular space, a piston carried by said shaft and adapted to oscillate thereon and to traverse the outer space between said shaft and casing, the movement of the piston in either direction about its axis being limited by contacting with the wall of said casing, and means for flexing said cover inwardly for varying the effective capacity of said annular space.

12. In a shock absorber, a housing and cover structure, a hollow shaft journaled therein, a T-shaped piston carried by said shaft and adapted to oscillate thereon, said piston being limited in its oscillatory movement by the wall of said housing, a bore extending through said piston and communicating with the interior of said hollow shaft and connecting the space within said hollow shaft with the annular space between said shaft and casing.

13. In a shock absorber of the class described a casing, a cover for said casing, a hollow shaft journaled therein and cooperating with said casing to form an annular space, a member attached to said casing and traversing the said annular space and bearing against said hollow shaft, a double acting piston carried by said shaft and cooperating with said member to divide said annular space into a pair of chambers, a passageway connecting said annular space with the interior of said hollow shaft, and valve means for regulating the flow of liquid from within said shaft to said annular space, and means for flexing said cover inwardly for varying the effective capacity of said annular space.

14. In a shock absorber of the character described a casing having a cover and adapted to be filled with liquid, a hollow shaft journaled in said casing and dividing the casing into an inner compartment and an outer compartment, a lever connected with one end of said shaft by means of which the shaft may be rotated, a piston connected with said shaft and adapted to be moved to engage the walls of said casing, a passageway extending through said piston and communicating said outer compartment with the interior of said hollow shaft, a bore leading through said shaft and connecting said outer chamber with the interior of said hollow shaft and valve means arranged within said hollow shaft for controlling the flow of liquid between the outer compartment and the interior of said hollow shaft when said piston is turned in either direction.

15. In a hydraulic shock absorber a housing and cover therefor and adapted to be filled with liquid, a hollow shaft journaled in said housing and cooperating therewith to form an annular compression chamber, a double acting oscillatory piston carried by said shaft and adapted to engage the wall of said housing when said shaft is turned in either direction, a member non-rotatably connected with said housing and traversing said compression chamber, a passageway leading from one side of said piston through said hollow shaft to the opposite side of said piston and means arranged within said hollow shaft and operable from the exterior thereof for regulating the flow of liquid through said passageway, and means for flexing said cover inwardly for varying the effective capacity of said compression chamber.

16. A hydraulic shock absorber for retarding movement between two relatively movable members comprising a cup shaped housing having a cover and adapted to be filled with liquid, a hollow shaft journaled in said casing and cooperating therewith to provide a compression chamber, a double acting piston connected with said shaft and movable with respect thereto to engage the wall of said housing when said shaft is turned in either direction, a member non-rotatably connected with said housing and traversing said compression chamber, a bore leading through said hollow shaft and connecting the interior of said shaft with said compression chamber, a passageway leading through said piston and communicating with the interior of said shaft, valve means arranged within said hollow shaft and operable from the exterior thereof for regulating the flow of liquid from one side of said piston to the opposite side thereof when said shaft is rotated, means connecting said housing with one of said movable members and means connecting said shaft with the other of said movable members, and means for flexing said cover inwardly to vary the effective capacity in said compression chamber.

17. In a shock absorber, a housing adapted to be filled with a liquid, a hollow shaft journaled in said housing and cooperating therewith to form an annular compression chamber, a double acting piston connected with said shaft so as to have a limited movement with respect thereto, a member non-rotatably connected with said housing and traversing said compression chamber, a passageway connecting said compression chamber with the interior of said hollow shaft and means arranged within said shaft for regulating the flow of liquid from one side of said piston to the opposite side thereof when said shaft is turned in either direction, a cover for said casing and means for flexing the same inwardly to vary the effective capacity of said annular compression chamber.

18. In a shock absorber, the combination of a housing, a shaft journaled in said housing and providing an annular compression chamber, an annular member arranged within said housing and surrounding said shaft and traversing the space between said shaft and housing, said member being hollow and in communication with the interior of said shaft whereby to provide an auxiliary supply reservoir.

19. In a shock absorber, the combination of a cylindrical housing having a peripheral flange thereon, a hollow shaft journaled in said housing and dividing the same into an inner compartment and an outer compartment, an abutment carried by said housing and traversing said outer compartment, a piston arranged within said outer compartment and connected with said shaft, a cover closing the upper end of said outer compartment and surrounding said shaft, a ring member engaging said periheral flange, a second ring member cooperating with said first ring member to secure the cover against said flange.

20. In a shock absorber, the combination of a cylindrical housing, a hollow shaft journaled in said housing and dividing the same into an inner compartment and an outer compartment, an abutment arranged within said outer compartment and connected with said housing, a piston arranged within said outer compartment and connected with said shaft, a cover member for said outer compartment and means for flexing said cover member inwardly to vary the effective capacity of said outer compartment.

21. In a shock absorber, the combination of a cylindrical housing, a shaft journaled in said housing and dividing the same into an inner compartment and an outer compartment, a cover for said outer compartment surrounding said shaft, a reserve reservoir formed within said housing and lying wholly within the contour thereof and having communication with said inner compartment.

22. In a shock absorber, the combination of a cylindrical housing, of a hollow shaft journaled in said housing and dividing the same into an inner compartment and an outer compartment, said shaft having a plurality of bores therein, an abutment arranged within said outer compartment and connected with said housing, a piston arranged within said outer compartment and connected with said shaft, a cam shaped valve member arranged within said shaft and adapted to be regulated to cut off communication through one or more of said bores.

23. In a shock absorber the combination of a cylindrical pressed metal housing, a hollow shaft journaled in said housing and providing an annular compression chamber, an abutment arranged within said compression chamber and connected with said housing, a piston arranged within said compression chamber and operatively connected with said shaft, said shaft having a plurality of passageways therein providing communication between said compression chamber and the interior of said hollow shaft, valve means arranged within said hollow shaft for controlling the flow of liquid through said passageways, and means for flexing a portion of said housing inwardly to vary the effective capacity of said compression chamber.

24. In a hydraulic shock absorber, the combination of a housing formed of drawn sheet metal, a ring member fitted into the bottom of said housing, a cover for said housing, a ring member secured over the exterior of the said housing and retaining the cover in place, and a bracket secured to said housing and serving to secure the shock absorber to a vehicle.

25. A shock absorber comprising a circular cup-shaped housing formed of drawn metal, a shaft journaled in said housing, a ring member fitted into the bottom of said housing and providing a bearing for said shaft, a circular cover for said housing fitting into the open end thereof, and a second ring member engaging the peripheral edge of said housing and holding said cover in place.

26. A shock absorber comprising a circular cup-shaped housing formed of drawn metal, and having an outwardly directed peripheral flange theron, a shaft journaled in said housing, a ring member fitted into the bottom of said housing and providing a bearing for the inner end of said shaft, a circular cover member fitting into the open upper end of said housing, a second ring member threadedly secured to said cover member and engaging over said peripheral flange serving to hold the cover in place.

27. A shock absorber comprising a circular cup-shaped housing formed of drawn metal, having an outwardly directed peripheral flange thereon, a shaft journaled in said housing, a ring member fitted into the bottom of said housing and providing a bearing for the inner end of said shaft, a circular cover member fitting into the open upper end of said housing, a second ring member threadedly secured to said cover structure and engaging over said peripheral flange serving to hold the cover in place, the upper surface of said first mentioned ring member forming a sharp corner with said housing.

28. In a hydraulic check, a casing, a shaft journaled in said casing and a wing piston connected to said shaft, an abutment connected with said casing and cooperating with said casing and piston to define a pair of working compartments, a cover closing the end of said casing, a primary adjusting means associated with said cover for controlling the flow of liquid within said working compartments and additional adjusting means for regulating the flow of liquid within said working compartments, one of said adjusting means including a thermostatically controlled valve.

29. In a hydraulic check, a casing, a shaft journaled in said casing and a wing piston connected to said shaft, an abutment connected with said casing and cooperating with said casing and piston to define a pair of working compartments, a cover closing the end of said casing, a primary adjusting means associated with said cover for controlling the flow of liquid within said working compartments and additional adjusting means for regulating the flow of liquid within said working compartments, said secondary adjusting means consisting of a rotary member associated with said shaft for regulating the flow of liquid from one side of said piston to the other side thereof, one of said adjusting means including a thermostatically controlled valve.

30. In a hydraulic check, a casing, a shaft journaled in said casing and a wing piston connected to said shaft, an abutment connected with said casing and cooperating with said casing and piston to define a pair of working compartments, a cover closing the end of said casing, a primary adjusting means associated with said cover for controlling the flow of liquid within said working compartments and additional adjusting means for regulating the flow of liquid within said working compartments, said secondary adjusting means consisting of a rotary member extending through said shaft and having a cam-shaped element for regulating the flow of liquid between said working compartment, and means extending through said shaft accessible from the exterior thereof for adjusting the position of said rotary member.

31. In a hydraulic check, a casing, a shaft within said casing, a piston connected with said shaft, an abutment anchored within said casing and cooperating with said piston and casing to form a pair of working compartments, a reserve supply reservoir associated with said casing, a passageway leading from said reserve supply reservoir, a second passage connected with said first passage and leading through said piston and discharging into said working compartments, the flow through said second passage being controlled by the position of said piston.

32. In a hydraulic check, a casing, a shaft within said casing, a piston connected with said shaft, an abutment anchored within said casing and cooperating with said piston and casing to form a pair of working compartments, a reserve supply reservoir associated with said casing, a passageway leading from said reserve supply reservoir, a second passage leading through said piston and connected with said first passageway and discharging into said working compartments, the delivery end of said second passage being controlled by the position of the piston relative to the wall of said casing.

33. In a hydraulic check, a casing, a cup-shaped shaft journaled within said casing, a piston connected with said shaft, an abutment anchored within said casing and cooperating with the piston and casing to define a pair of working compartments, an annular member fitted into the bottom of said casing and together with the wall of said casing forming a reserve supply reservoir, means connecting said reserve supply reservoir with said working compartments and valve means associated with said reserve supply reservoir for controlling the pressure therein.

34. In a hydraulic check, a casing, a shaft journaled within said casing, a piston connected with said shaft, an abutment anchored within said casing and cooperating with the piston and casing to define a pair of working compartments, a reserve supply reservoir associated with said casing and means connecting the same with said pair of working compartments, said means including a passageway in said piston, said piston having a limited movement with respect to said shaft and means for controlling the position of said piston with respect to said casing.

35. In a hydraulic shock absorber, the combination of a housing formed of drawn sheet metal and a shaft journaled in said housing, a piston in said housing connected with said shaft, a ring member fitted into the bottom of said housing, a sheet metal cover closing the upper end of said housing and forming a bearing for said shaft, an outwardly extending flange on said housing adapted to be exteriorly engaged by said cover, the working faces of said cover and ring member being disposed in a plane at right angles to the axis of said shaft.

36. In a hydraulic check, a casing, a shaft journaled in said casing, a piston connected with said shaft, an abutment anchored within said casing and cooperating with the piston and casing to define a pair of working compartments, a reserve supply reservoir associated with said casing and means connecting the same with said pair of working compartments, said piston having a limited movement with respect to said shaft and means for controlling the position of said piston with respect to said casing.

37. In a hydraulic check, the combination of a cup-shaped housing of drawn sheet metal, said housing having an interior, circumferential rounded corner at its bottom, a ring-shaped member inserted in said housing, said ring-shaped member cut away at one of its outer circumferential corners, said cut-away portion adapted to provide clearance for said rounded corner of the aforesaid cup-shaped housing, the other outer corner of said ring member having a sharp edge, the outer diameter of said ring member substantially the same as the interior diameter of said housing, a cover member inserted in the open end of said housing and adapted to maintain the roundness of said housing, a shaft journaled in said housing structure, an abutment anchored in said housing and forming an interrupted annular chamber and a piston constrained to move with said shaft.

38. In a hydraulic check, the combination of a cup-shaped housing of drawn sheet metal, said housing having an interior, circumferential rounded corner at its bottom, a ring-shaped member inserted in said housing, said ring-shaped member cut away at one of its outer circumferential corners, said cut-away portion adapted to provide clearance for said rounded corner of the aforesaid cup-shaped housing, the other outer corner of said ring member having a sharp edge, the outer diameter of said ring member substantially the same as the interior diameter of said housing, a cover member inserted in the open end of said housing and adapted to maintain the roundness of said housing, an outwardly extending flange on said housing, a ring member adapted to exteriorly engage said flange, a shaft journaled in said housing structure, an abutment anchored in said housing and forming an interrupted annular chamber and a piston constrained to move with said shaft.

39. A hydraulic check comprising a casing, a shaft journaled in said casing, a piston connected with said shaft, an abutment anchored in said casing and dividing the space in said casing into a pair of working compartments, a cover for said casing, an opening in said cover serving as a bearing for said shaft, a shoulder on said shaft contacting with the face of said bearing and adapted to maintain the said shaft in axial position, an annular recess surrounding said shaft adjacent said shoulder, a vent passage connecting the inner part of said bearing with a low pressure space within the casing, an outwardly beveled recess in the outer part of said bearing, packing in said recess, a spring element compressing and packing and an external cup member engaging said spring element.

40. A hydraulic check comprising a casing. a shaft journaled in said casing, a piston connected with said shaft, an abutment anchored in said casing and dividing the space in said casing into a pair of working compartments, a cover for said casing, an opening in said cover serving as a bearing for said shaft, a shoulder on said shaft contacting with the face of said bearing and adapted to maintain the said shaft in axial position. an annular recess surrounding said shaft inwardly of said bearing, a second annular recess surrounding said shaft outwardly of said bearing, packing in the last named recess, a coiled spring compressing said packing and a cup-shaped member centralizing said spring relative to said shaft.

41. In a hydraulic check, the combination of a casing, a shaft journaled in said casing, a movable element connected with said shaft and traversing the space between said shaft and casing, a stationary element anchored in said casing and traversing the space between said shaft and casing, said stationary element and movable element forming a pair of working compartments, one of said elements having a recess therein, passages connecting the said recess with the opposite sides of the element, a cylindrical valve fitting into said recess with working clearance, said valve machined to provide a passage, a coiled thermostatic element arranged within said recess and connected with said valve, said thermostatic element adapted to move said valve relative to one of the aforesaid passages whereby to regulate the flow of fluid through said passage.

42. In a hydraulic check, the combination of a casing, a shaft journaled in said casing, a movable element connected with said shaft and traversing the space between said shaft and casing, a stationary element anchored in said casing and traversing the space between said shaft and casing, said stationary element and movable element forming a pair of working compartments, one of said elements having a recess therein, passages connecting the recess with opposite sides of the element, a cylindrical valve fitting into said recess with working clearance, said valve machined to provide a passage, the said valve having an extending stem portion, a coiled thermostatic element surrounding said stem portion and adapted to regulate the position of said valve.

43. In a hydraulic check, the combination of a casing, a shaft journaled in said casing, a movable element connected with said shaft and traversing the space between said shaft and casing, a stationary element anchored in said casing and traversing the space between said shaft and casing, said stationary element and movable element forming a pair of working compartments, one of said elements having a recess therein, passages connecting the recess with opposite sides of the element, a cylindrical valve fitting into said recess with working clearance, said valve machined to provide a passage, the said valve having an extending stem portion, a coiled thermostatic element surrounding said stem portion and adapted to regulate the position of said valve, and means for selectively locating the initial position of said valve.

44. In a hydraulic check, the combination of a casing, a shaft journaled in said casing, a movable element connected with said shaft and traversing the space between said shaft and casing, a stationary element anchored in said casing and traversing the space between said shaft and casing, said stationary element and movable element forming a pair of working compartments, a passage connecting said compartments, a recess in said passage, a cylindrical valve fitting into said recess with working clearance, said valve machined to provide a passage, the said valve having an extending stem portion, a bimetallic thermostatic element formed to fit into said recess, the stem of the aforesaid valve passing through a portion of said thermostatic element and attached thereto, and a portion of said thermostatic element secured against movement relative to the walls of said recess.

45. In a hydraulic check, the combination of a casing, a shaft journaled in said casing, a movable element connected with said shaft and traversing the space between said shaft and casing, a stationary element anchored in said casing and traversing the space between said shaft and casing, said stationary element and movable element forming a pair of working compartments, a passage connecting said compartments, a recess in said passage, a cylindrical valve fitting into said recess with working clearance, said valve machined to provide a passage, the said valve having an extending stem portion, a bimetallic thermostatic element formed to fit into said recess, the stem of the aforesaid valve passing through a portion of said thermostatic element and attached thereto, a portion of said thermostatic element secured against movement relative to the walls of said recess, and means for adjusting the initial position of said valve.

46. In a hydraulic check, the combination of a casing, a shaft journaled in said casing, a movable element connected with said shaft and traversing the space between said shaft and casing, a stationary element anchored in said casing and traversing the space between said shaft and casing, said stationary element and movable element forming a pair of working compartments, a passage connecting said compartments, a recess in said passage, a cylindrical valve fitting into said recess with working clearance, said valve machined to provide a passage, and a coiled thermostatic element arranged within said recess and connected with said valve, said thermostatic element adapted to move said valve relative to the aforesaid passage whereby to regulate the flow of fluid through said passage.

COURTNEY N. MITCHELL.